P. O. SERCK.
MANUFACTURE OF TUBULAR HEAT EXCHANGE APPARATUS.
APPLICATION FILED MAR. 31, 1920.
1,363,208. Patented Dec. 21, 1920.
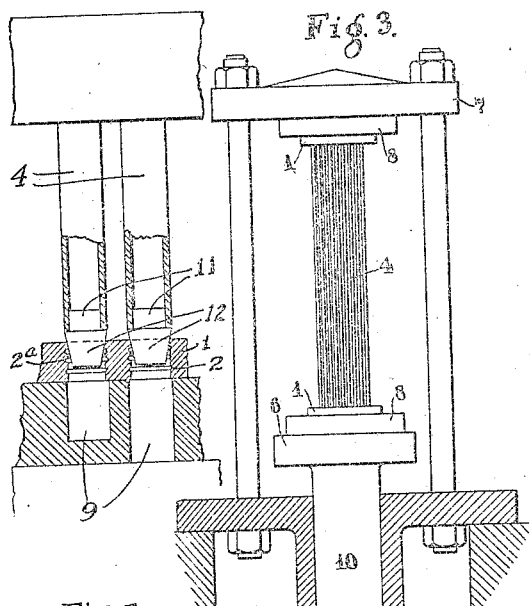
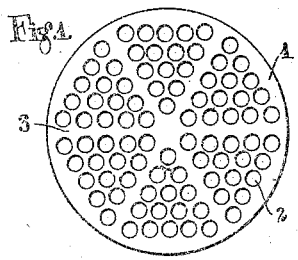
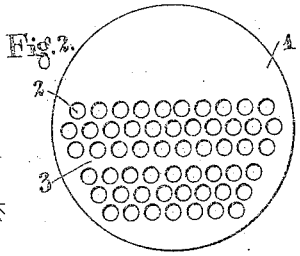
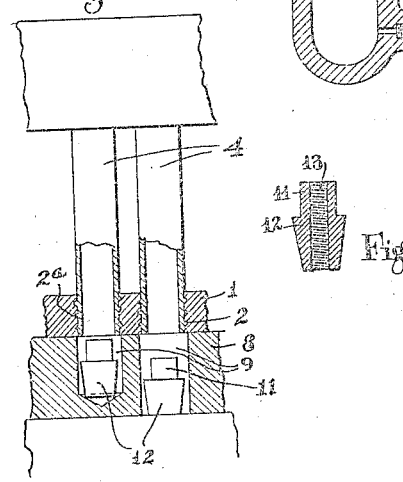
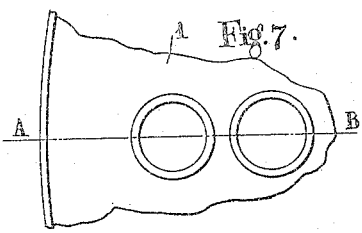
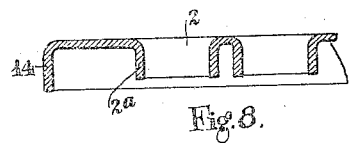
INVENTOR
P. O. SERCK,
BY H. R. Kerslake
ATTORNEY

UNITED STATES PATENT OFFICE.

PETER O. SERCK, OF BIRMINGHAM, ENGLAND.

MANUFACTURE OF TUBULAR HEAT-EXCHANGE APPARATUS.

1,363,208.   Specification of Letters Patent.   Patented Dec. 21, 1920.

Application filed March 31, 1920. Serial No. 370,268.

*To all whom it may concern:*

Be it known that I, PETER OSCAR SERCK, a subject of the King of Norway, and residing at Warwick Road, Greet, Birmingham, in the county of Warwick, England, have invented certain new and useful Improvements in Connection with the Manufacture of Tubular Heat-Exchange Apparatus, of which the following is a specification.

This invention relates to improvements in connection with the manufacture and construction of tubulous cooling or heating apparatus, such as radiators or condensers of the type having a series of tubes mounted in end plates or casings and through or around which air, gas, vapor, water or other fluid passes for the purpose of parting with or receiving heat.

The invention more particularly has reference to radiators for use in connection with heavy automobile vehicles and the like, and to coolers and condensers for oil or other liquids in which the liquid is under pressure.

The object of the invention is to provide an improved manner of manufacture in connection with apparatus of the kind above indicated.

According to the invention, end-plates, end casings or similar elements are provided with holes of any suitable shape which are drilled, punched, stamped, drawn or formed by means of die castings or any other method and into which tubulous members of corresponding shape are introduced by the aid of guiding means, and made secure for the purposes required by means of pressure.

Further features of the invention will be hereinafter described and defined in the claims.

In the accompanying drawings which illustrate the invention diagrammatically:

Figures 1 and 2 are front views of end-plates or like members in which holes for the insertion of tubulous members are formed in groups.

Fig. 3 is an elevation partly in section of a hydraulic press adapted for the purpose of the invention and shows a stack of tubulous members with their end-plates under treatment.

Figs. 4 and 5 are part sectional elevations illustrating the operation of fixing tubulous members into end-plate holes, the walls of which are provided with grooves, the figures showing the relative positions before and after the operation of inserting the tubes.

Fig. 6 is a sectional elevation of a guide member or plug for use in introducing the tubular members into holes in the end-plates.

Fig. 7 is an underneath plan of a portion of an end-plate the holes in which are drawn.

Fig. 8 is a section on the line A—B of Fig. 7.

In carrying out the invention according to one convenient mode by way of example, two end-plates of disk or other suitable shape are mounted on the platform of a multiple spindle drilling machine of the type used for flange drilling, the drills of which are arranged close together and so that a large number of holes are drilled simultaneously. By this means the holes may be arranged more closely together and the thickness of metal separating one hole from another may be less than would be the case were each hole drilled independently as the tendency to distort the metal is eliminated by the simultaneous action of the drills.

In circumstances when it is not convenient or desirable to employ a drilling machine which will drill all the holes in an end-plate at one time, the desired effect may be produced by drilling the holes 2 in groups as, for example, as shown in Figs. 1 and 2, which show end-plates 1 with two forms of grouping, the holes in each group being located as close to one another as in the case when all the holes are drilled in a plate at the same time, but between one group and the next an increased width of metal 3 is provided. By this arrangement any tendency to distort the plate is avoided.

The securing of a stack of tubes in their end-plates is effected in a hydraulic or other press which may be either vertical, horizontal or inclined. The setting up or placing in position of the stack in the end-plates may be effected upon the press or elsewhere prior to their introduction to the press. The ends of the tubes 4 are preliminarily placed in alinement with the holes 2 of the end-plates so that both end-plates are in position upon the stack of tubes before the pressure of the hydraulic press is brought to bear.

In setting the stack of tubes with its end-plates in position between the platform 6 and head 7 of the press, pressure plates 8 are introduced between the end-plates of the stack 4 and the platform 6 and the head 7. The pressure plates 8 are formed with recesses or holes 9 which have been drilled or otherwise formed therein. These recesses 9 are of slightly larger diameter than the holes 2 in the end-plates. The number of recesses 9 formed in the pressure plates coincides with the number of holes in the end-plates and each recess is located so that it is concentric with the hole with which it is adapted to correspond.

When the stack of tubes 4 with its end-plates 1 and corresponding upper and lower pressure plates 8 is in position between the platform 6 and head 7 of the press (Fig. 3) and the necessary adjustments have been made, pressure is brought to bear by the upward movement of the ram 10 which causes the tubes 4 to enter the holes 2 which accurately center themselves by the means hereinafter described. The pressure is continued until the ends of the tubes have passed through the holes 2. Owing to the outside diameter of the tubes 4 being slightly larger than the diameter of the holes 2, the pressure to which the stack of tubes is subjected causes each tube at or toward its ends to be compressed so that the junction between the tube and the metal plate is so close as to be in effect an integral union.

For the purpose of centering the tubes in position, guiding members each in the form of a removable plug, as shown in Fig. 6, may be provided. This plug comprises a cylindrical portion 11, the diameter of which is slightly less than the internal diameter of the tube in which it is intended to fit, and a portion 12 in the shape of a truncated cone or frustum, the larger diameter of which is slightly smaller than the outside diameter of a tube and equal to or a little larger in diameter than the diameter of the holes in the end-plates, while the smaller diameter of the frustum is suitably less than the diameter of the end-plate holes, so that it may act as an easy guide for the tubes during the process of insertion. These guide plugs may be internally screw-threaded as at 13 for the purpose of removing them from the tubes, should for any reason there be any difficulty in extracting them by hand or for the purpose of taking them out of the pressure plates into which they pass after the operation, as will be hereinafter described.

In employing the guide plugs, the cylindrical portions 11 are inserted in the ends of the tubes and the frustum 12 is positioned in the holes 2 of end-plates 1. The pressure plates 8 are formed of sufficient thickness to permit the holes or recesses 9 to receive the plugs after they have passed through the end-plates as shown in Fig. 5. While in Figs. 4 and 5 the end-plates are shown as applied to the lower ends of the tubes, it is to be understood that these plates may be applied to both ends of a stack of tubes simultaneously. Upon the completion of the operation the plugs may be lifted out or removed from the tubes or the holes or recesses in the end-plates by the aid of a suitable screw-threaded key (when necessary) which is screwed into the screw-threaded passage 13 in the plugs.

According to the form illustrated, the end-plate 1 is provided with holes 2 which are formed with three or any suitable number of annular grooves 2$^a$ for the purpose of improving the joint made between the tubes and the plate. Under the pressure of the hydraulic ram, the metal of the outer skin of the ends of the tube flows into these grooves, the result of which is shown in Fig. 5.

In carrying out the invention according to another manner, instead of drilling a series of holes in the end-plates, these holes may be formed drawn after the manner shown in Figs. 7 and 8, in which the drawn holes 2 are formed with flanges 2$^a$ and at the same time the plate is provided with a peripheral flange 14 for use in forming an end casing. According to this form an end plate of thinner metal may be employed than in the case where the holes are drilled. In this method, as in that whereby the holes are drilled, it is preferred that the holes should be formed simultaneously or in suitable groups.

The words "in close proximity" employed in the following claims are intended to mean that the adjacent holes are formed at such a small distance apart from one another that, if formed singly or one at a time, the end plate would be in danger of being buckled or deformed.

Having now described my invention, what I claim as new and desire to secure by Letters Patent is:—

1. A method of manufacturing tubulous heat-exchange apparatus, consisting in forming simultaneously the requisite number of holes in close proximity to one another in an end plate, forming the end plate holes with annular grooves, assembling the tubular members and perforated end plate with the tubular members disposed in the desired relation to the end plate and with the ends of the said members centered in axial alinement with their respective perforations, and applying pressure in the direction of length of the tubular members to cause the ends of the said members simultaneously to be forced and guided into their respective end plate perforations.

2. A method of manufacturing tubulous heat-exchange apparatus, consisting in forming simultaneously the requisite number of holes in close proximity to one another in an end plate, forming the end plate holes with annular grooves, forming the tubular members with tapering ends, assembling the tubular members and perforated end plate with the tubular members disposed in the desired relation to the end plate and with the tapering ends of the tubular members engaging in axial alinement with their respective perforations, and applying pressure in the direction of length of the tubular members to cause the ends of the said members simultaneously to be forced and guided into their respective end plate perforations.

3. A method of manufacturing tubulous heat-exchange apparatus, consisting in forming in close proximity to one another the requisite number of holes in each of the end plates simultaneously, forming the end plate holes with annular grooves, assembling the perforated end plates and tubular members with the latter extending lengthwise between the end plates and with the ends of the tubular members centered in axial alinement with the said holes, and applying pressure in the direction of length of the said members to cause the ends of all the tubular members simultaneously to be forced and guided in their respective holes in both end plates.

4. A method of manufacturing tubulous heat-exchange apparatus, consisting in forming in close proximity to one another the requisite number of holes in each of the end plates simultaneously, forming the end plate holes with annular grooves, forming the tubular members with tapering ends, assembling the perforated end plates and tubular members with the latter extending lengthwise between the end plates and with the tapering ends of the tubular members engaging in the said holes, and applying pressure in the direction of length of the said members to cause the ends of all the tubular members simultaneously to be forced and guided in their respective holes in both end plates.

In testimony whereof I have signed my name to this specification.

P. O. SERCK.